United States Patent
Spahn et al.

(10) Patent No.: US 8,590,928 B2
(45) Date of Patent: Nov. 26, 2013

(54) KNEE AIRBAG WITH PASSIVE VENTING FOR OUT OF POSITION OCCUPANT PROTECTION

(75) Inventors: Brian Robert Spahn, Plymouth, MI (US); Manoharprasad K. Rao, Novi, MI (US); Ian Brewster Hall, Kensington, MD (US)

(73) Assignee: Ford Global Technologies, LLC, Dearborn, MI (US)

(*) Notice: Subject to any disclaimer, the term of this patent is extended or adjusted under 35 U.S.C. 154(b) by 90 days.

(21) Appl. No.: 13/184,681

(22) Filed: Jul. 18, 2011

(65) Prior Publication Data

US 2013/0020788 A1    Jan. 24, 2013

(51) Int. Cl.
  *B60R 21/276*  (2006.01)
  *B60R 21/239*  (2006.01)

(52) U.S. Cl.
  USPC ............................. 280/739; 280/729; 280/732

(58) Field of Classification Search
  CPC ...................................................... B60R 21/239
  USPC ............... 280/729, 730.1, 732, 739, 736, 737
  See application file for complete search history.

(56) References Cited

U.S. PATENT DOCUMENTS

| | | | |
|---|---|---|---|
| 2,834,606 A | 5/1958 | Bertrand | |
| 3,414,292 A | 12/1968 | Oldberg et al. | |
| 3,642,303 A | 2/1972 | Irish et al. | |
| 3,767,225 A | 10/1973 | Mazelsky | |
| 3,768,830 A | 10/1973 | Hass | |
| 4,043,572 A * | 8/1977 | Hattori et al. | 280/738 |
| 4,290,627 A | 9/1981 | Cumming et al. | |
| 5,775,729 A * | 7/1998 | Schneider et al. | 280/730.1 |
| 5,927,748 A * | 7/1999 | O'Driscoll | 280/729 |
| 6,092,836 A * | 7/2000 | Saslecov | 280/730.1 |
| 6,431,583 B1 | 8/2002 | Schneider | |
| 6,685,217 B2 * | 2/2004 | Abe | 280/730.1 |
| 6,712,384 B2 * | 3/2004 | Abe | 280/730.1 |
| 7,070,201 B2 | 7/2006 | Song et al. | |

(Continued)

FOREIGN PATENT DOCUMENTS

| | | |
|---|---|---|
| JP | 8080797 A | 3/1996 |
| JP | 2001106013 A2 | 4/2001 |

(Continued)

OTHER PUBLICATIONS

Bito et al. JP 2011-051424 English translation, 14 pgs.*

(Continued)

*Primary Examiner* — Karen Beck
(74) *Attorney, Agent, or Firm* — Frank A. MacKenzie; Brooks Kushman P.C.

(57) ABSTRACT

A knee airbag installed in a lower portion of an instrument panel has a deployed condition wherein it extends rearward and upward. The airbag has a left lobe, a right lobe, and a central portion between and joined to the left and right lobes. A vent is formed in the reaction surface of each of the lobes to allow inflation gasses to escape from the airbag when, during a crash event, an occupant force applied forwardly against the lobes is below a threshold level. When the occupant force reaches or exceeds the threshold level, the vents are urged against the instrument panel to substantially block the escape of inflation gasses. The threshold level is selected such that a child-sized occupant standing forward of a desired passenger seating position exerts less than the threshold level.

16 Claims, 4 Drawing Sheets

(56) References Cited

U.S. PATENT DOCUMENTS

| | | | |
|---|---|---|---|
| 7,175,195 B2 | 2/2007 | Morita | |
| 7,314,230 B2 | 1/2008 | Kumagai et al. | |
| 7,322,599 B2* | 1/2008 | Abe et al. | 280/730.1 |
| 7,380,823 B2 | 6/2008 | Abe et al. | |
| 7,549,671 B2 | 6/2009 | Mizuno et al. | |
| 7,597,355 B2 | 10/2009 | Williams et al. | |
| 7,661,700 B2* | 2/2010 | Imamura et al. | 280/730.1 |
| 7,850,200 B2* | 12/2010 | Zauritz et al. | 280/740 |
| 7,942,440 B2* | 5/2011 | Choi | 280/740 |
| 7,988,188 B2* | 8/2011 | Zauritz et al. | 280/730.2 |
| 8,146,943 B2* | 4/2012 | Fukawatase et al. | 280/739 |
| 2003/0015861 A1* | 1/2003 | Abe | 280/730.1 |
| 2004/0124617 A1* | 7/2004 | Morita | 280/732 |
| 2006/0028004 A1 | 2/2006 | Oota et al. | |
| 2006/0202452 A1 | 9/2006 | Breed et al. | |
| 2007/0216146 A1 | 9/2007 | Williams et al. | |
| 2007/0267852 A1 | 11/2007 | Enders | |
| 2007/0273133 A1* | 11/2007 | Zauritz et al. | 280/742 |
| 2007/0296192 A1 | 12/2007 | Sano | |
| 2008/0054602 A1* | 3/2008 | Yang | 280/729 |
| 2008/0122205 A1 | 5/2008 | Imamura et al. | |
| 2011/0062692 A1* | 3/2011 | Yamane | 280/739 |
| 2011/0204603 A1* | 8/2011 | Fukawatase et al. | 280/730.1 |

FOREIGN PATENT DOCUMENTS

| | | |
|---|---|---|
| JP | 2002037003 A | 2/2002 |
| JP | 2004210097 A | 7/2004 |
| JP | 2005193819 A | 7/2005 |
| JP | 2007062552 A | 3/2007 |
| JP | 2008285092 A | 11/2008 |
| JP | 2011051424 A | 3/2011 |

OTHER PUBLICATIONS

Toyota Europe Corporate Website, Airbags, http://www.toyota.eu/06_Safety/04_implementing_passive_safety/02_airbags.aspx, Mar. 30, 2009.

Delphi Media Room Press Photos, Media Room, https://delpho.com/about/news/media/photos/safety/58391?print=1, Mar. 30, 2009.

airbag systems.org, Occupant Positioning Airbags, http://www.airbagsystems.org/id23/html, Mar. 30, 2009.

European Patent Office, Intellectual Property Office, Search Report for corresponding GB 1209989.1 mailed Sep. 6, 2012.

* cited by examiner

KNEE AIRBAG WITH PASSIVE VENTING FOR OUT OF POSITION OCCUPANT PROTECTION

TECHNICAL FIELD

The invention relates to inflatable airbags used in automotive vehicles for occupant protection, and more specifically to a knee airbag that deploys upwardly from a relatively low position on the passenger side of the vehicle.

BACKGROUND

Most current automotive passenger vehicles include at least one inflatable airbag as part of the occupant protection system. Some proposed occupant protection systems combine an upper body airbag and a knee airbag. An upper body airbag is mounted to the instrument panel (IP) forward of a seated occupant at a relatively high position and deploys or inflates rearwardly to contact the occupant's chest or upper thorax region. A knee airbag is mounted to a lower position on the instrument panel and inflates or deploys to contact the occupant in the area of the knees and/or shins Recognized benefits of knee airbags include providing cushioning of any impact between the knees/lower legs and the lower portion of the instrument panel, as well as prevention of submarining, in which a seat occupant's hips move forwardly beneath a lap and/or chest restraint belt.

Examples of such knee airbag systems include U.S. patent applications 2004/0124617 A1 and U.S. 2007/0267852 A1 and U.S. Pat. No. 6,712,384. The '384 patent teaches that an upper body airbag and a knee airbag may be used in combination and that completing the expansion of the knee airbag earlier than the expansion of the body airbag may have benefits.

SUMMARY

According to an embodiment of the invention disclosed herein, an occupant protection system for a vehicle comprises a knee airbag installed in a lower portion of an instrument panel and having a deployed condition wherein it extends rearward and upward to place a reaction surface of the airbag in contact with the instrument panel. The airbag comprises a left lobe, a right lobe, and a central portion disposed between and joined to the left and right lobes. At least one vent is formed in each of the lobes on the reaction surface to allow inflation gasses to escape from the airbag when, during a crash event, a forwardly-directed force applied to the airbag by the occupant against the lobes is below a threshold level. When the occupant force reaches or exceeds the threshold level, the vents are urged against the instrument panel to substantially block the escape of inflation gasses.

In one disclosed embodiment of the invention, the threshold level is selected such that a child-sized occupant standing forward of a desired passenger seating position is expected to exert less than the threshold level of forward-directed occupant force. Venting of the inflation gasses prevents the airbag from inflating forcefully in order to reduce the likelihood of injury to the occupant.

In another disclosed embodiment of the invention, the threshold level is selected such that an adult-sized occupant seated in the desired passenger seating position and properly restrained by a seat belt is expected to exert less than the threshold level of forward-directed occupant force.

In another disclosed embodiment of the invention, an occupant protection system for a vehicle comprises a knee airbag installed in a lower portion of an instrument panel and having a deployed condition wherein it extends rearward and upward immediately adjacent to the instrument panel. The knee airbag comprises a left lobe, a right lobe, and a central portion disposed between and joined to the left and right lobes. At least one vent is formed in an instrument panel-facing surface of each lobe at positions such that the vents are urged against the instrument panel and substantially blocked when an occupant force directed forwardly against the lobes reaches a threshold level.

In another disclosed embodiment of the invention, a method of protecting an occupant located forward of a desired passenger seating position (an out-of-position occupant) in an automotive, comprises inflating a knee airbag stored in a lower portion of the instrument panel to deploy upwardly between the instrument panel and the occupant. The knee airbag has a left lobe, a right lobe, and a central portion disposed between and joined to the left and right lobes, and at least one vent formed in an instrument panel-facing surface of each lobe. An occupant force directed forwardly against the knee airbag by the occupant during the crash event is below a threshold level required to substantially block the escape of inflation gasses by urging vents against the instrument panel.

BRIEF DESCRIPTION OF THE DRAWINGS

Embodiments of the present invention will now be described by way of example only with reference to the accompanying drawings in which:

FIG. 3-B is a cross-sectional view taken along line 3-3 of FIG. 2 with the knee airbag in a non-vented state;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
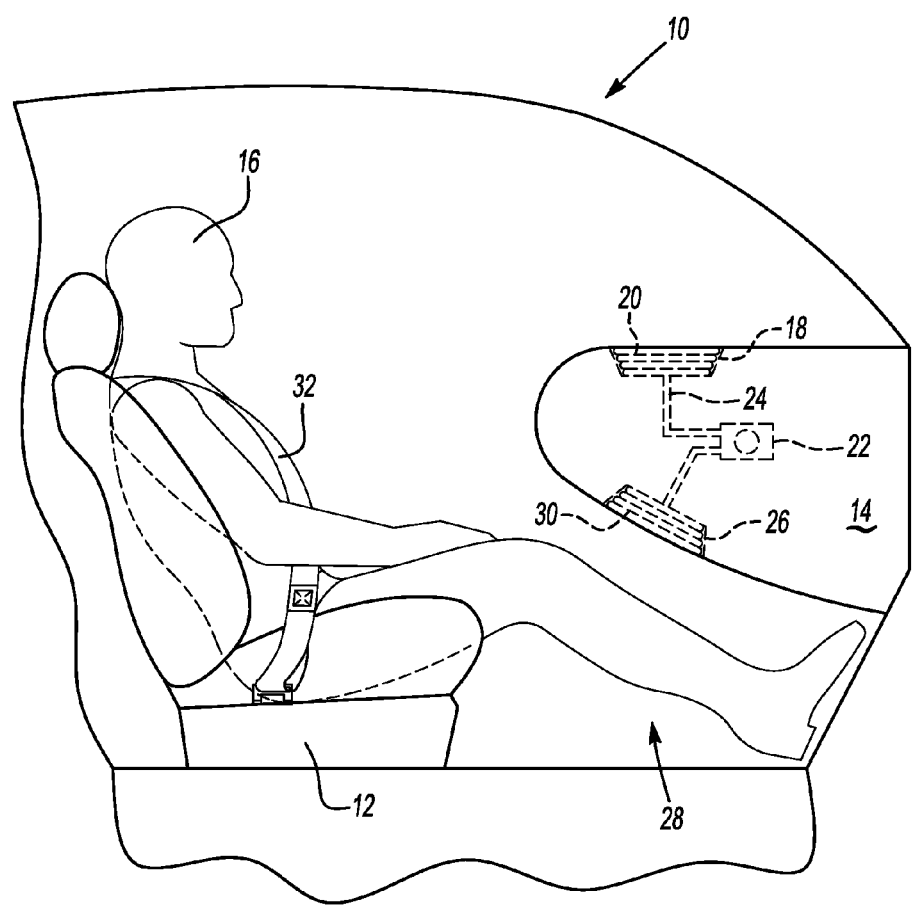
FIG. 1 is a schematic view of a vehicle passenger cabin equipped with upper body airbag and knee airbag systems.

FIG. 1 shows in schematic form the passenger cabin of an automotive vehicle 10 showing the passenger (i.e. non-driver) side of a front row seating position. A seat 12 is arranged rearward of a dashboard or instrument panel (IP) 14 in the conventionally known configuration. An occupant 16 is shown in a normal seated position in seat 12. Seat 12 defines a desired seating position and occupant 16 is referred to as an in-position occupant when properly seated in it.

An upper airbag module 18 is disposed in, on, or otherwise integrated with the IP 14 and is positioned on an upper portion of the IP so that the airbag may inflate upwardly and/or rearwardly toward the seated occupant 16. Airbag module 18 is shown schematically to include a chest airbag 20 stored in a folded, rolled, or otherwise compacted condition, as is well known in the occupant restraints art. An inflator 22 is shown located within IP 14 a short distance away from airbag module 18 and connected with the airbag by an inflation tube 24. Alternatively, inflator may be located immediately adjacent to airbag module 18 and discharge more directly into airbag 20.

A knee airbag module 26 is located in, on, or otherwise integrated with a lower portion of IP 14 adjacent a footwell area 28 forward of seat 12. As is well known in the occupant restraints arts, an inflatable knee airbag 30 is stored in the module 26 in a folded, rolled, or otherwise compacted condition. Knee airbag 30 may be supplied with inflation gases by the same inflator 22 that supplies chest airbag 20, or a separate inflator (not shown) may be provided to supply inflation gasses to the knee airbag module 26.

Chest and knee airbags 20, 30 may be manufactured of flexible, non-porous material(s), such as nylon.

Chest and knee airbags 20, 30 are part of an occupant protection system that includes a restraints control module (RCM) (not shown) and one or more crash sensors and/or occupant sensors (not shown), as are well known in the vehicle safety field. Depending upon the capabilities and programming of the occupant protection system, along with the nature (severity, direction, duration, etc.) of the collision or deceleration triggering the airbag deployment, chest airbag 20 and knee airbag 30 may be commanded to deploy either simultaneously or in sequence, the timing of their deployments intended to achieve optimum occupant safety.

Figure 2:
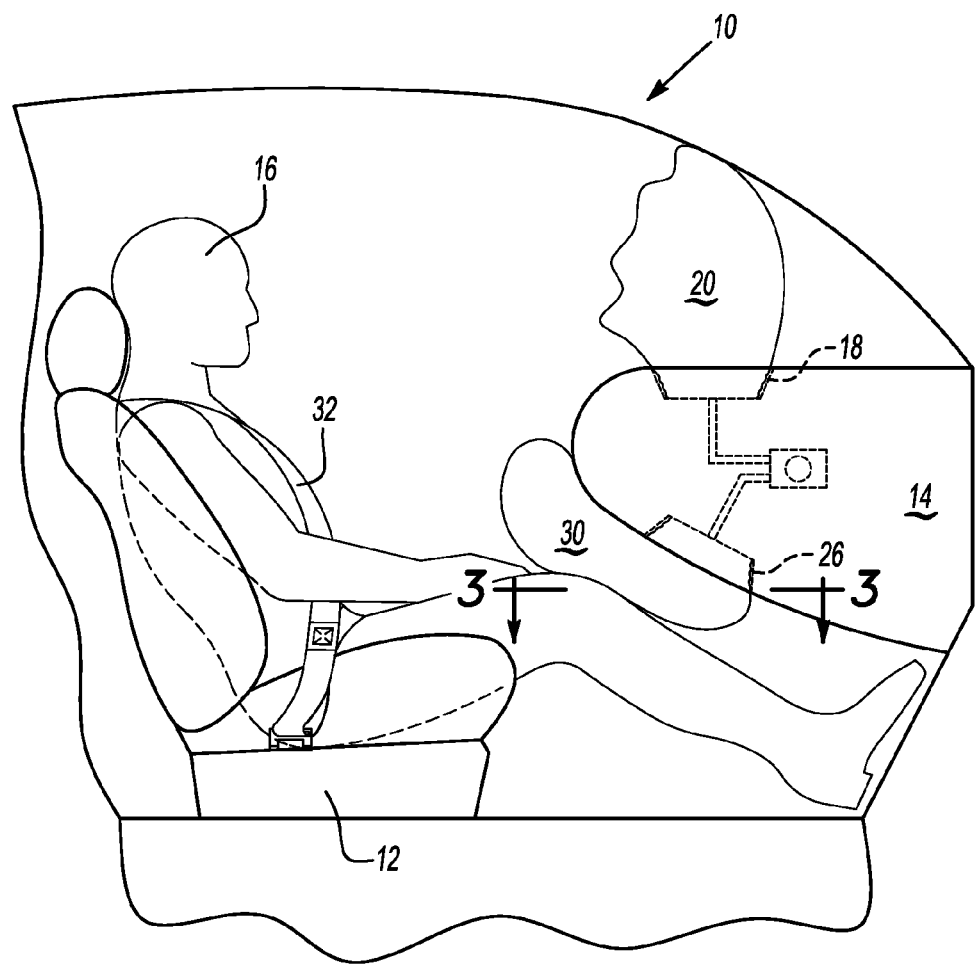
FIG. 2 is a schematic view of an upper body airbag and a knee airbag in inflated conditions relative to a seat occupant.

FIG. 2 illustrates the vehicle interior configuration of FIG. 1 except with chest airbag 20 in a partially inflated condition and knee airbag 30 in a fully (or nearly fully) inflated condition when adult-sized occupant 16 is properly belted into seat 12 ("in position"). Chest airbag 20 is shaped and otherwise adapted to inflate rearwardly toward occupant 16 to contact and restrain the upper thorax region of the occupant. Chest airbag 20 may include internal baffles, tethers, stitch lines, and/or features to achieve the desired inflated position and sequence of inflation, as is well known in the art.

Knee airbag 30 is configured and oriented to inflate upwardly and rearward (relative to the front/rear directions of the vehicle), immediately adjacent to the occupant-facing surface of IP 14. For the in-position occupant 16, knee airbag 30 provides cushioning between the occupant's knees/shins and the adjacent portions of IP 14. Knee airbag 30 may also prevent a condition known as submarining, wherein the occupant 16 may slide forwardly beneath a lap restraint belt (not shown) of the seatbelt system 32.

Figure 3A:
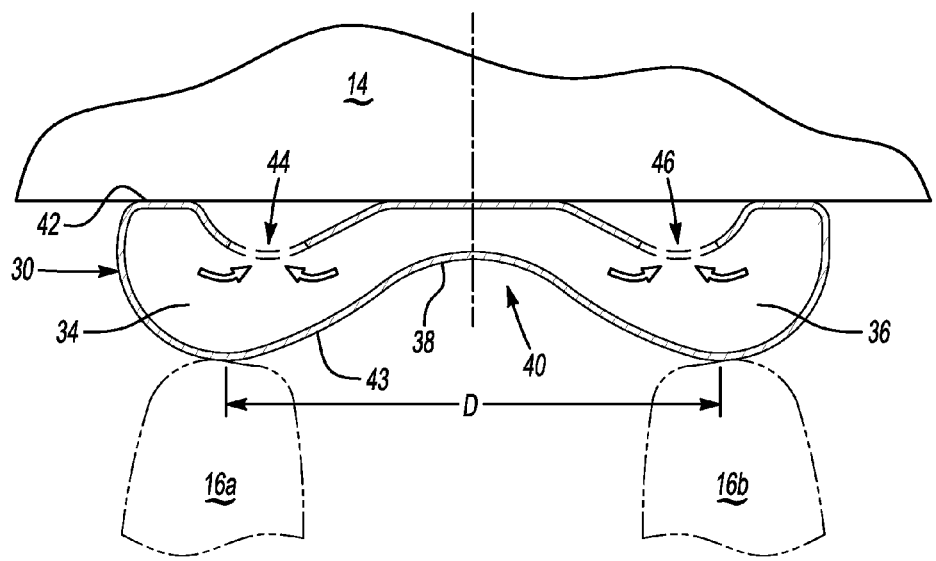
FIG. 3-A is a cross-sectional view taken along line 3-3 of FIG. 2 with the knee airbag in a venting state.

As may be seen in FIG. 3A, knee airbag 30 comprises a left lobe 34, a right lobe 36, and a central portion 38 disposed between and connecting the left and right lobes. When knee airbag 30 is deployed (inflated), the surface oriented toward and contacting the surface of IP 14 is known as the reaction surface 42, and the surface oriented toward occupant 16 is known as the primary surface 43. Reaction surface 42 lies close to the surface of IP 14 when the airbag is inflated. Central portion 38 may be thinner than lobes 34, 36 thereby creating a valley 40 in the central region between the lobes 34, 36.

The desired inflated shape and position of knee airbag 30 is achieved by means of internal baffles, tethers, stitch lines, and/or other features, as is well known in the art. Left and right lobes 34, 36 may be spaced apart from one another laterally by a distance D determined by an expected spacing between the left and right knees 16a, 16b consistent with normal adult knee spacing in a proper seating position of in-position occupant 16. The distance D is preferably selected to provide a maximum amount of protection for occupants of the widest possible range of body sizes.

Vent openings 44, 46 are formed in the reaction surface 42 of lobes 34, 36. The areas of reaction surface 42 immediately surrounding vent openings 44, 46 (which may be referred to as vent-bearing portions) may be recessed or relieved relative to the surrounding portions of the reaction surface such that the vent openings are spaced somewhat from the surface of IP 14 when the rest of the reaction surface is in contact with the IP surface. This recessing or relief of the vent-bearing portions of reaction surface 42 allows openings 44, 46 to remain unblocked by contact with the IP surface unless and until airbag 30 is urged forwardly against the IP by a significant amount of forward pressure applied to the lobes by the occupant. It is also possible for the surface of IP 14 to include recesses (not shown) in positions that will be aligned with vent openings 44, 46 when knee airbag 30 is deployed. Such recesses may be provided instead of, or in addition to, the relieved vent-bearing portions of reaction surface 42 to ensure that vent openings 44, 46 are not blocked.

Figure 3B:
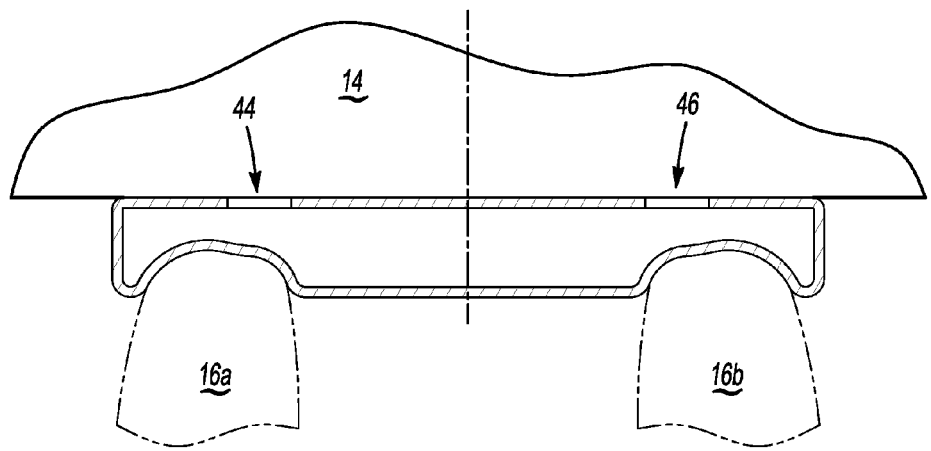

FIG. 3-A shows the condition in which occupant's knees 16a, 16b are contacting airbag 30 but is not applying sufficient force forwardly against the airbag to urge vent openings 44, 46 against IP 14 and thereby close the vents. This condition may exist when occupant 16 is properly restrained in seat 12 by belt 32. In this condition, inflation gasses entering the lobes escape relatively freely through vent openings 44, 46 and airbag 30 does not inflate forcefully.

FIG. 3-B shows the condition when the occupant's knees 16a, 16b press forwardly against lobes 34, 36 with a level of force sufficient to urge the vent-bearing portions of reaction surface 42 against IP 14 so that vent openings 44, 46 are substantially blocked by contact with the IP. When vent opening 44, 46 are blocked in this manner, little venting of inflation gasses occurs so that pressure builds up rapidly within knee airbag 30 to provide firm cushioning for occupant 16.

The level of the forward-directed occupant force required to close or substantially close the vents by urging them against IP 14 is referred to as the threshold level of occupant force. The threshold level of occupant force may be exceeded if the occupant 16 is thrown forward relative to the seat so that the occupant's knees 16a, 16b are forced into contact with lobes 34, 36. This may occur during a severe collision or other rapid deceleration of the vehicle, and/or when the occupant is not securely/properly belted into seat 12. The threshold force level may also be exceeded if the occupant is properly belted but knees 16a, 16b are positioned so far forward (due, for example, to fore/aft adjustment of seat 12 and/or the occupant having long femurs) that when knee airbag 30 deploys the airbag contacts the occupant's knees 16a, 16b with sufficient force that vent openings 44, 46 are urged against the surface of IP 14.

Figure 4:
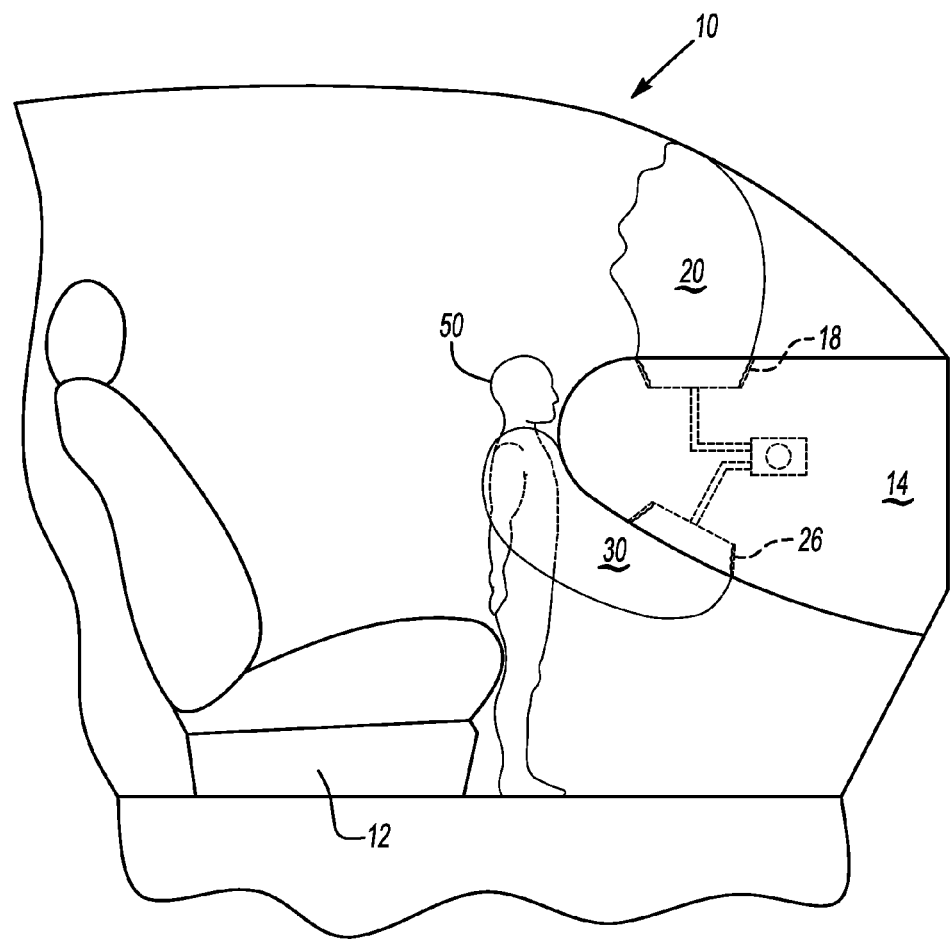
FIG. 4 is a schematic view of an out-of-position occupant with upper and knee airbags in early phases of deployment.

Referring now to FIG. 4, the same vehicle interior configuration as FIG. 1 is shown but with an out-of-position occupant (OOPO) 50 present in the front seat area and during early phases of an airbag inflation event. OOPO 50 is shown as a small-statured and/or child-sized individual. For example, some occupant protection testing protocols used in the automotive safety industry use test dummies representative of an average-sized three year-old and an average-sized six year-old. OOPO 50 is shown standing forward of seat 12 and close to the surface of IP 14, as this is a commonly-used test configuration.

Knee airbag 30 is configured such that lobes 34, 36 inflate first, before central portion 38, and primarily upwardly, remaining close to the passenger-facing surface of IP 14. Early and rapid inflation of lobes 34, 36 causes the as-yet uninflated central portion 38 to be inserted between IP 14 and OOPO 50. Inflating lobes 34, 36 before central portion 38 allows all of the available inflation gasses to be directed into the lobes, so that the lobes inflate as quickly as possible and thereby insert central portion 38 between OOPO 50 and IP 14.

Knee airbag 30 may be constructed with stitching, baffles, internal tethers, or other well-known features to create an internal flow path which inflation gases follow during inflation. The internal flow path is engineered so that knee airbag 30 inflates in the desired fashion as described above. For example, internal baffles 52 (shown schematically in FIG. 5) may be positioned to restrict, direct, or otherwise control the flow of inflation gasses from lobes 34, 36 into center portion 38. It is also possible to utilize multiple inflators (not shown) to achieve the desired inflation sequence. The manner in which knee airbag 30 is packed (by folding, rolling, compacting, etc.) for stowage inside airbag module 26 may also contribute to achieving the proper inflation sequence, as is well known in the occupant restraints arts.

Figure 5:
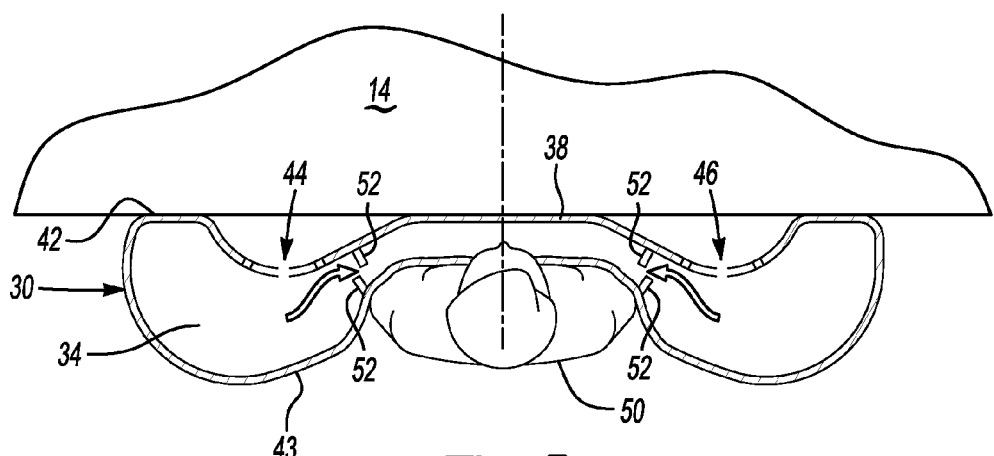
FIG. 5 is a downward-looking sectional view of the knee airbag and occupant of FIG. 4.

As seen in FIG. 5, OOPO 50 makes contact primarily with the central portion as opposed to lobes 34, 36. Consequently, the occupant force applied to lobes 34, 36 by OOPO 50 does not reach the threshold level required to urge the vent openings 44, 46 against IP 14 and thereby close them. Because vent openings 44, 46 remain open, knee airbag 30 either does not fill at all, or fills relatively gradually so as to expand rearward at a rate that applies little force to OOPO 50.

The valley 40 at the center region of knee airbag 30 may be sized such that even if the OOPO 50 is somewhat offset from being centered between lobes 34, 36 when the inflation sequence begins, inflation of the lobes between IP 14 and the OOPO will tend to urge the OOPO toward a more centered position. If OOPO 50 is somewhat offset from being centered between lobes 34, 36 when the inflation sequence begins, a reduction in inflation-induced forces is provided by the venting of the unobstructed lobe.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An occupant protection system for a vehicle comprising a knee airbag installed in a lower portion of an instrument panel and having a deployed condition wherein it extends rearward and upward to place a reaction surface of the airbag in contact with the instrument panel, the airbag comprising:
    a left lobe, a right lobe, and a central portion disposed between and joined to the left and right lobes; and
    a vent formed in each of the lobes on the reaction surface, a vent-bearing portion of the reaction surface immediately adjacent each vent is recessed relative to a portion of the reaction surface surrounding the vent-bearing portion, whereby the vent-bearing portion is spaced from the instrument panel such that the vents are spaced from the instrument panel to allow inflation gasses to escape from the airbag when an occupant force directed forwardly against the lobes is below a threshold level, and the vent bearing portions are urged against the instrument panel to substantially block the escape of inflation gasses when the occupant force reaches or exceeds the threshold level.

2. The apparatus of claim 1 wherein the threshold level is selected such that a child-sized occupant standing forward of a desired passenger seating position is expected to exert an occupant force less than the threshold level.

3. The apparatus of claim 1 wherein the threshold level is selected such that an adult-sized occupant seated in a desired passenger seating position and properly restrained by a seat belt is expected to exert an occupant force less than the threshold level.

4. The apparatus of claim 1 wherein when the airbag is in an inflated state the left and right lobes are thicker than the central portion to form a valley in the central portion oriented toward the passenger.

5. The apparatus according to claim 1 wherein the left and right lobes are spaced apart from one another by a distance determined by an expected inter-knee distance of a passenger properly seated in the passenger seating position.

6. The apparatus of claim 1 wherein the knee airbag is configured to inflate the lobes prior to the inflation of the central portion.

7. The apparatus of claim 1 further comprising:
    a chest airbag installed in an upper portion of an instrument panel and having a deployed condition wherein it extends rearward to contact a thorax region of a seated occupant.

8. The apparatus of claim 7 wherein the chest airbag and the knee airbag are supplied with inflation gasses by a common inflator.

9. An occupant protection system for a vehicle comprising a knee airbag installed in a lower portion of an instrument panel and having a deployed condition wherein it extends rearward and upward immediately adjacent to the instrument panel, the knee airbag comprising:
    a left lobe, a right lobe, and a central portion disposed between and joined to the left and right lobes;
    a vent formed in a vent-bearing portion of an instrument panel-facing surface of each lobe, the vent-bearing portion immediately adjacent each vent being recessed relative to a portion of the instrument panel-facing surface surrounding the vent-bearing portion such that the vent-bearing portions are urged against the instrument panel and the vents are substantially blocked when an occupant force directed forwardly against the lobes reaches a threshold level, and the vent-bearing portions are spaced from the instrument panel to permit flow through the vents when the occupant force is below the threshold level.

10. The apparatus of claim 9 wherein the threshold level is selected such that a child-sized occupant standing forward of a desired passenger seating position is expected to exert an occupant force less than the threshold level.

11. The apparatus of claim 9 wherein the threshold level is selected such that an adult-sized occupant seated in a desired passenger seating position and properly restrained by a seat belt is expected to exert an occupant force less than the threshold level.

12. The apparatus of claim 9 wherein when the airbag is in an inflated state the left and right lobes are thicker than the central portion to form a valley in the central portion oriented toward the passenger.

13. The apparatus according to claim 9 wherein the left and right lobes are spaced apart from one another by a distance determined by an expected inter-knee distance of a passenger properly seated in the passenger seating position.

14. The apparatus of claim 9 wherein the airbag is configured to inflate the lobes prior to the inflation of the central portion.

15. The apparatus of claim 9 further comprising:
a chest airbag installed in an upper portion of an instrument panel and having a deployed condition wherein it extends rearward to contact a thorax region of a seated occupant.

16. The apparatus of claim 15 wherein the chest airbag and the knee airbag are supplied with inflation gasses by a common inflator.

\* \* \* \* \*